United States Patent
Klotz

[11] Patent Number: 5,949,433
[45] Date of Patent: Sep. 7, 1999

[54] PROCESSING IMAGE DATA

[75] Inventor: Karl-Heinz Klotz, Schwaz, Austria

[73] Assignee: Discreet Logic, Inc., Montrial, Canada

[21] Appl. No.: 08/840,134

[22] Filed: Apr. 11, 1997

[30] Foreign Application Priority Data

Apr. 11, 1996 [GB] United Kingdom ............ 9607541

[51] Int. Cl.$^6$ .................................................. G06T 15/00
[52] U.S. Cl. ........................................ 345/435; 345/419
[58] Field of Search .................................. 345/435, 419, 345/433, 436, 473–475

[56] References Cited

U.S. PATENT DOCUMENTS 4,970,666 11/1990 Welsh et al. .......................... 345/423
5,479,597 12/1995 Fellous ................................. 345/302
5,751,927 5/1998 Wason ................................. 345/419

FOREIGN PATENT DOCUMENTS 2271241 6/1994 United Kingdom .
2305050 3/1997 United Kingdom .

OTHER PUBLICATIONS

Fukui, Kazuo, et al., "A Virtual Studio System for TV Program Production," SMPTE Journal, vol. 103, No. 6, Jun. 1994, pp. 386–390.

*Primary Examiner*—Almis R. Jankus
*Attorney, Agent, or Firm*—James Creighton Wray; Meera P. Narasimhan

[57] ABSTRACT

Real image data is generated by a camera in addition to positional data representing characteristics of said camera, including an indication of zoom control. A synthesized image is generated for combination with the real image and the perceived focus of the synthesized image is adjusted in response to zoom control adjustment, so as to effect a focusing difference between a portion of said real image and a portion of said synthesized image.

11 Claims, 14 Drawing Sheets

$$\begin{bmatrix} \dfrac{1}{\tan(\alpha) \cdot \text{aspect ratio}} & , & 0 & , & 0 & , & 0 \\ 0 & , & \dfrac{1}{\tan(\alpha)} & , & 0 & , & 0 \\ d_x + o_x & , & d_y + o_y & , & -\left(\dfrac{\text{far} + \text{near}}{\text{far} - \text{near}}\right) & , & -1 \\ 0 & , & 0 & , & \dfrac{2 \cdot \text{far} \cdot \text{near}}{\text{far} - \text{near}} & , & 0 \end{bmatrix}$$

where $\alpha$ = angle of field of vision, $o_x$ = original$_x$, $o_y$ = original$_y$, $d_x = -k_x \cdot \dfrac{\text{far} + \text{near}}{\text{window resolution}_x}$, $-k_x \cdot \dfrac{\text{dof \%}}{50} \cdot \dfrac{\text{near}}{\text{plane-in-focus}}$, $d_y = -k_y \cdot \dfrac{\text{top} - \text{bottom}}{\text{window resolution}_y}$, $-k_y \cdot \dfrac{\text{dof \%}}{50} \cdot \dfrac{\text{near}}{\text{plane-in-focus}}$, dof % = percentage size of depth of field.

Figure 11

|  | OUTPUTS | | | |
|---|---|---|---|---|
| INPUTS | $\frac{x'}{w'}$ | $\frac{y'}{w'}$ | $\frac{z'}{w'}$ | $w'$ |
| $\frac{x}{w}$ | a | e | i | m |
| $\frac{y}{w}$ | b | f | j | n |
| $\frac{z}{w}$ | c | g | k | o |
| $w$ | d | h | l | p |

Figure 12a $$\frac{x'}{w'} = \frac{ax}{w} + \frac{by}{w} + \frac{cz}{w} + dw$$

$$\frac{y'}{w'} = \frac{ex}{w} + \frac{fy}{w} + \frac{gz}{w} + hw$$

$$\frac{z'}{w'} = \frac{ix}{w} + \frac{jy}{w} + \frac{kz}{w} + lw$$

$$w' = \frac{mx}{w} + \frac{ny}{w} + \frac{oz}{w} + pw$$

Figure 12b $$x' = w' \cdot \frac{x'}{w'}$$

$$y' = w' \cdot \frac{y'}{w'}$$

$$z' = w' \cdot \frac{z'}{w'}$$

Figure 12c $$\frac{x'}{w'} = \frac{x}{w} \cdot \frac{1}{\tan(\alpha) \cdot \text{aspect ratio}} + \frac{z}{w}(d_x + 0_x)$$

$$\frac{y'}{w'} = \frac{y}{w} \cdot \frac{1}{\tan(\alpha)} + \frac{z}{w}(d_y + 0_y)$$

$$\frac{z'}{w'} = \frac{-z}{w} \cdot \left(\frac{\text{far} + \text{near}}{\text{far} - \text{near}}\right) + \frac{2z}{w} \cdot \left(\frac{\text{far} \cdot \text{near}}{\text{far} - \text{near}}\right)$$

$$w' = -z$$

PROCESSING IMAGE DATA

The present invention relates to processing image data in which real image data generated by camera is combined with synthesized image data.

INTRODUCTION

Techniques for generating realistic three-dimensional synthetic images are becoming established in increasingly diverse applications due to the steady decrease in cost of high performance processing components, and the continuing advance in the art of graphic manipulation procedures. As the realism of synthetic images improves, a clear goal has been identified, which is to produce synthetic images which are indistinguishable from real images. While this goal may be attainable when a single image is to be generated, the rapid generation of picture frames which represent complicated moving and interacting objects in real-time requires considerable computational resources. This goal is made even more difficult when real images are combined in real time with synthetic images, as the human eye is sensitive to subtle differences between image qualities.

An emerging application of real-time three-dimensional graphics is the virtual studio. In a virtual studio, images of a real set, usually including a television presenter, are combined with images generated from a virtual set. Most of the real studio consists of a blue background, which is then replaced electronically with the virtual set. Parts of the real image which are not coloured blue are superimposed on the virtual set, in such a way that the final combined image appears realistic. A studio of the type is disclosed in U.S. Pat. No. 5,479,597 or Armand Fellows.

An advantage of the virtual studio is that only a small real studio space is required, upon which an image of a much larger virtual studio area may be imposed, including various three-dimensional stage props and logos specific to a television programme. Once a recording for a particular programme has been completed, the entire virtual set may be replaced instantly, so the studio is ready for use in a completely different television program. In a traditional studio, different hardware, in the form of stage props and so on, may be needed for each different program. In the course of a week, many dozens of different television programs with different stage props may be required, which would either have to be stored carefully, or alternatively constructed from scratch.

A major constraint in operating a virtual studio is the need to maintain precise alignment between the characteristics and position of the real camera and those of a virtual camera which is modelled in the image synthesising computer. The human eye is easily able to detect subtle differences between real and virtual images, such as mismatch in focus, which will then result in a less convincing perception of the combined studio image.

SUMMARY OF THE INVENTION

According to a first aspect of the present invention, there is provided a method of processing image data, wherein real image data generated by a camera is combined with synthesized image data, comprising steps of generating camera positional data representing characteristics of said camera, including an indication of zoom control; generating a synthesized image in response to said positional data; and adjusting the perceived focus of said synthesized image in response to zoom control adjustments, so as to effect a focusing difference between a portion of said real image and a portion of said synthesized image.

Preferably, a portion of said synthesized image is defocused to emphasize its location behind said portion of the real image.

BRIEF DESCRIPTION OF THE DRAWINGS

FIG. 11 details the projection matrix used in FIG. 10;

FIGS. 12A–12C detail the structure of a matrix of the type shown in FIG. 11 and which is used for three dimensional graphical manipulations;

DETAILED DESCRIPTION OF THE PREFERRED EMBODIMENT

The invention will now be described by way of example only, with reference to the accompanying figures identified above.

Figure 1:
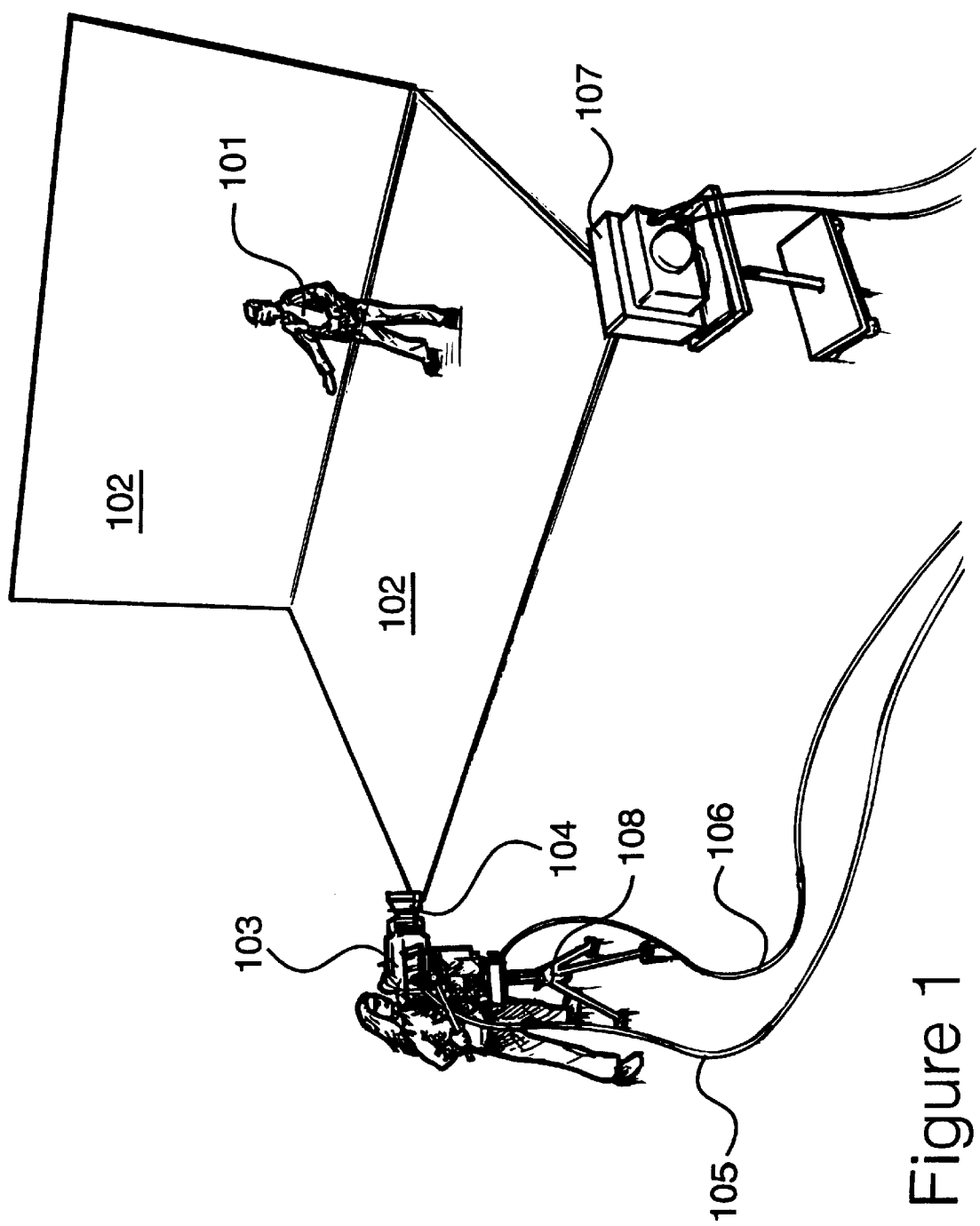
FIG. 1 shows a real set in a virtual studio, including a television monitor.

A virtual studio is shown in FIG. 1, which includes a presenter 101 against a blue background 102. A television camera 103, fitted with a zoom lens 104, is rotatably mounted on a fixed tripod 108. The camera 103 generates a video signal which is supplied to processing equipment along a video cable 105. Sensors mounted on the camera 103 and between the camera 103 and the tripod 108, generate signals which define the pan, rotation and tilt of the camera 103, and the zoom and focus of the zoom lens 104. These signals are combined in interface and processing circuitry mounted with the camera, and are supplied over an RS432 serial data cable 106, to processing equipment. The presenter 101 is able to view the resulting combined real and virtual images on a video monitor 107, mounted at the side of the studio set. In some circumstances, it will be necessary for the presenter to be aware of the location of virtual objects not physically located within the real set, in order to maintain a convincing illusion of their presence. Thus, the presenter may point to a virtual object which does not physically exist, by coordinating their movements with the resulting image shown on the video monitor 107.

Figure 2:
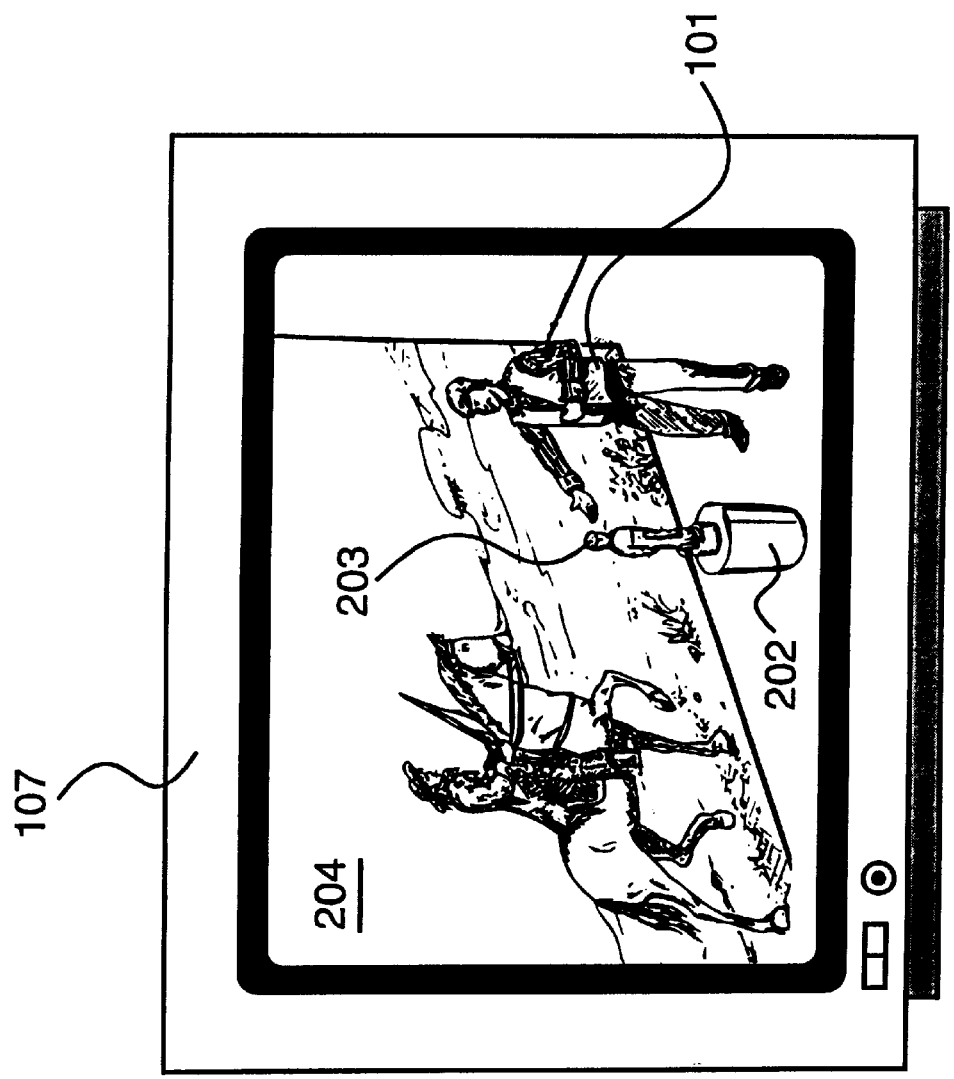
FIG. 2 shows the combined image shown on the monitor shown in FIG. 1.

The image displayed on the video monitor 107, shown in FIG. 1, is detailed in FIG. 2. The presenter 101 is the only part of the displayed image included in the combined image. All the other areas 102 of the real studio within the field of view of the camera 103 are coloured blue, and are thus replaced by a synthesized virtual set. The components of the virtual set include a pedestal, 202, upon which is a statue 203. In the background there is a two dimensional backdrop 204 consisting of moving images from a film.

Thus the virtual set includes both three-dimensional and two dimensional objects, which are viewed by a virtual camera. The virtual location of the virtual camera is arranged to follow the real location of the real camera, so that a change in view of the presenter 101 will result in an appropriate shift in view of the objects in the virtual set. For example, the real camera 103 may pan to the left and zoom in slightly, so that the centre of the field of view shifts from the presenter 101 to the statue 203. Because all the virtual objects are accurately modelled in three dimensions, the parallax between the statue 203 and the background shifts accordingly. Furthermore, the two dimensional film clip shown on the virtual backdrop 204 is projected differently, so as to maintain coherence between real and virtual images.

Figure 3:
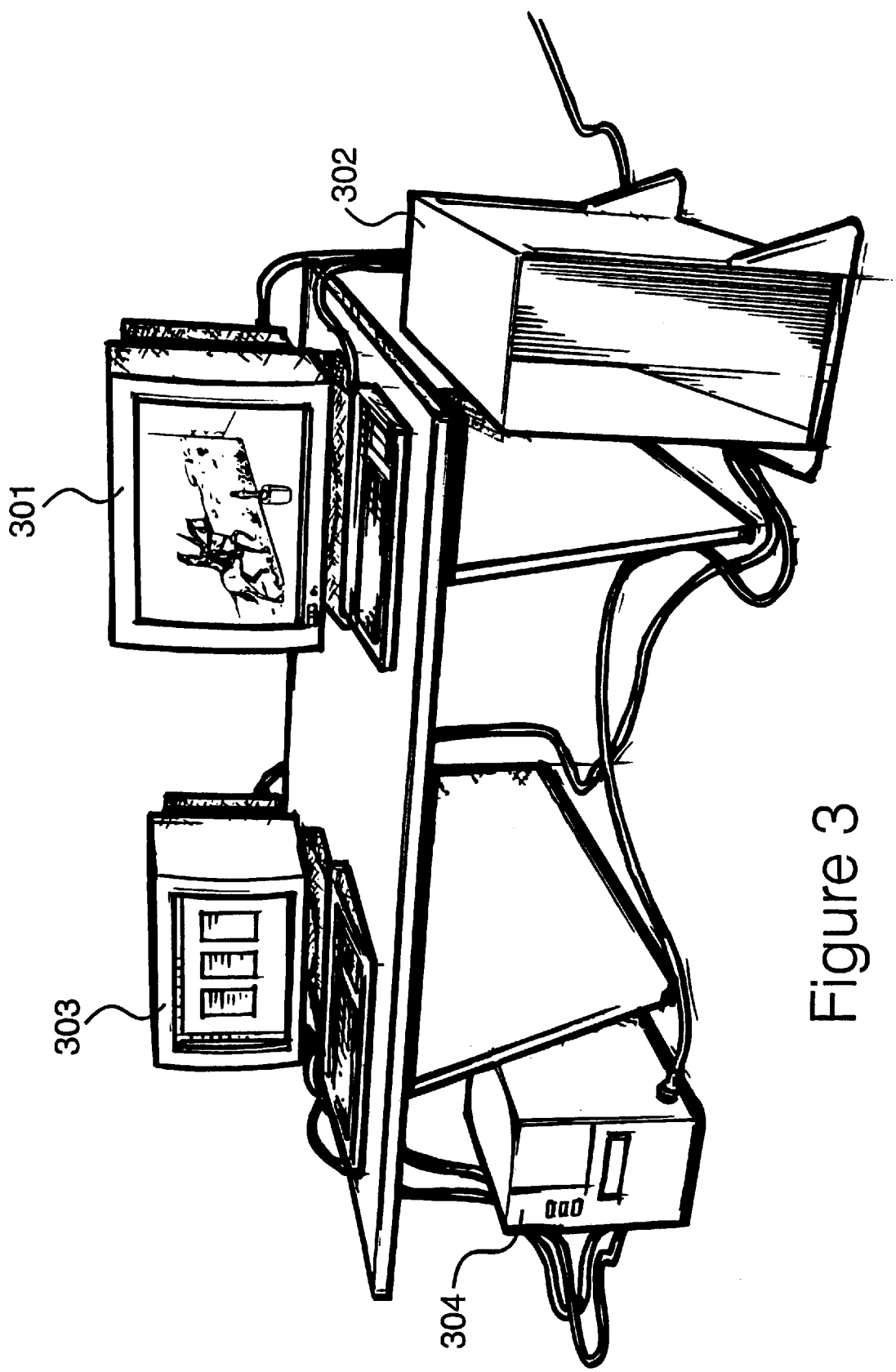
FIG. 3 details control equipment used to generate the combined image shown in FIG. 2, including a graphics processor.

Control over the virtual studio environment, including the selection of virtual objects to be included in the overall image produced, is performed using the equipment shown in FIG. 3. A high quality graphics terminal 301, such as that manufactured by Silicon Graphics Inc, displays the combined real and virtual images produced by the virtual studio. A graphics processor 302 provides the processing capability for generating the virtual set. The graphics processor 302 also receives video signals from the real camera 103 and combines these with the synthesised image of the virtual set. The graphics processor 302 is an SGI Onyx Reality Engine Two, manufactured by Silicon Graphics Incorporated. An editing terminal 303 is used to control the set-up of the virtual studio using a text editor. The editing terminal 303 is connected to an SGI Indigo workstation 304, which provides storage and editing facilities. The workstation 304 communicates with the graphics processor 302 via an ethernet connection. Thus, an operator may control the graphics environment which is synthesized by the graphics workstation 302 and displayed on the high quality graphics monitor 301, using the terminal 303 which is connected to the workstation 304.

Typical operations carried out by operators using the equipment shown in FIG. 3 relate to the particular requirements of operating a virtual studio. Firstly, it is essential that the locations of the real and virtual cameras should be matched. Thus, having positioned the camera 103 on its tripod 108, and perhaps selecting a suitable type of lens 104 for the program which is to be broadcast or recorded, it is necessary to determine the exact physical location of the camera. This is done in two stages. Firstly the optical centre of the lens is located. When mounting a lens on a camera, although the lens is mounted firmly, its precise location cannot be predicted with absolute accuracy. Thus, when zooming in and out, the part of the video image which remains stationary is typically slightly out of alignment with the centre of the image as it is measured electronically.

For example, in a video camera which uses charge coupled devices (CCD) as its image sensors, the image comprises a matrix of pixels, with each pixel comprising three sub-pixels defining the red, green and blue components, as produced by three separate CCD sensors. The image has a precise number of pixels in the horizontal and vertical dimensions. Typically this number may be in the region of six hundred vertical pixels by eight hundred horizontal pixels. The electronic centre of the image is located at the pixel co-ordinates (400,300).

Having mounted a lens, the camera operator zooms in and out in order to determine which part of the image remains stationary. It is this location which is then considered to be the optical centre of the camera and lens combination. Having calibrated the optical centre, the camera operator need not measure the physical location of the camera; this would not be a useful measurement, since the measurements that are required must be made with respect to the precise location of an image focused onto the CCD plane, which may be located at an unknown, or at least not sufficiently precisely known, location within the casing of the camera 103.

In order to accurately calibrate the physical location of the camera, or more correctly, to match the location of the focused image in the real camera with those produced by the virtual camera, sightings of several known points in the real studio set are made. Thus, in order to define the location of the camera in three dimensions, sightings of three points in the studio are made by matching the optical centre, now marked by a cross on a monitor, with markers in the studio. The locations of these points in three dimensions are precisely known, and are fixed. Better accuracy may be achieved by sighting four or more known points, with inconsistency between the combined results being averaged to provide a reading of improved accuracy. For example, if five points are sighted, these five are subdivided into all possible permutations of groups of three. The position of the camera is calculated for each permutation, and then the average of the results is used to define the camera position. Thus a sequence of calibrations is performed by the camera operator making various sightings, and a terminal operator, using the terminal 303, supplies appropriate control instructions to the system such that data received from the camera's rotation, pan, tilt, focus and zoom sensors, is combined in the appropriate way during these calibration procedures.

The camera 103 shown in FIG. 1 supplies two types of electrical signals. The first type of signal is video, an electrical representation of the image focused onto the CCD sensors in the camera. The second type of electrical signal defines the position of the camera and its lens settings. A typical zoom lens 104 mounted on a television camera includes rings for zoom, focus and aperture. Of these, the zoom and focus are required in order to define realistic real-time behaviour of the virtual camera, Thus, rotary sensors are mounted on the camera lens. These rotary sensors contain twin optical emitters and detectors, separated by a serrated disc. The disc is mechanically coupled to the movement of a lens ring, such that the passage of light between one emitter-sensor pair occurs in precedence to the passage of light between the other emitter sensor pair. Thus, the direction of rotation of the serrated disk may be detected by the precedence of an electrical signal from either of the optical sensors. Furthermore, rotation of the serrated disk results in repeated blocking and unblocking of the light reaching each sensor, and this may be used to determine a change in position. This technique is known as optical quadrature detection, and generates electrical pulses which are particularly suitable for interfacing to digital electronic circuitry.

Each of the zoom and focus rings has a rotary sensor, which supplies electrical signals which may be interpreted as providing a relative indication of the respective ring position. By calibrating the absolute position of the lens rings with reference to a known visual target, the relative incrementing and decrementing electrical signals from the rotary sensors can be used to derive an absolute position of the zoom and focus rings, in conjunction with appropriate calibration instructions issued from the terminal 303 shown in FIG. 3.

Additional rotary sensors are provided on the camera and its associated camera head mount, which is a multi-dimensional fixture providing freedom of movement of the entire camera in dimensions of pan—rotate about a vertical axis, or vertical panoramic, and tilt—rotate about a horizontal axis, or horizontal panoramic. The absolute values of these sensors are determined during the sighting calibration procedure described above.

Figure 4:
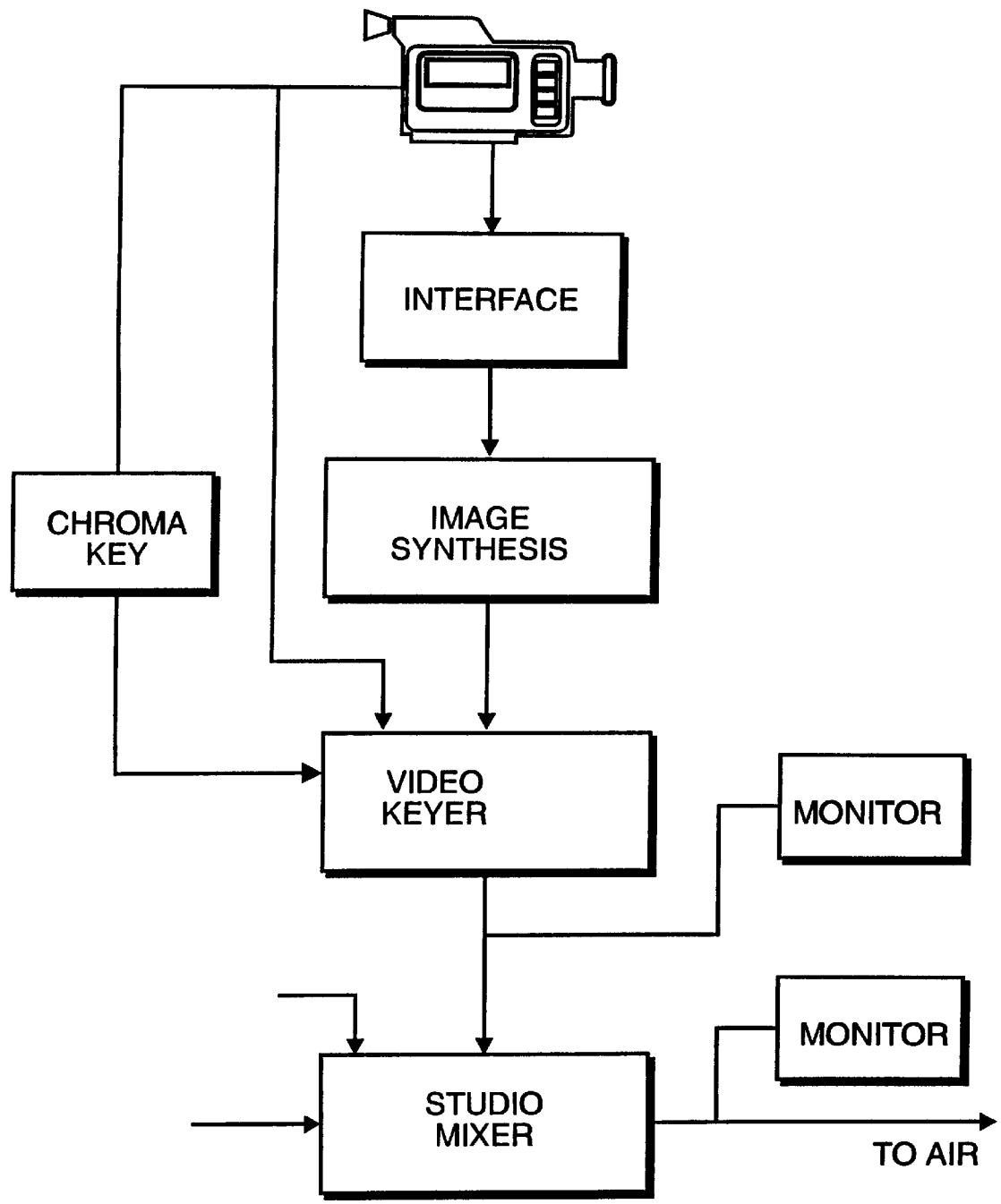
FIG. 4 details connections between the graphics processor shown in FIG. 3 and other equipment used in a virtual studio.

Connections between the camera 103 and other studio equipment are summarised in FIG. 4. The camera assembly, indicated schematically as 401, generates a video output 402 and positional output 403. The positional outputs are supplied to an interface 404 which in turn supplies positional data to an image synthesizing process 405. The image synthesizing process 405 generates a synthesized video image which responds to movements and adjustments of camera assembly 401 in a way similar to that in which a conventional video signal would respond to such adjustments.

The conventional video signal generated by the camera assembly 401 is supplied to a video rate chroma keying system 406 arranged to produce a key or matte signal that responds to the saturated blue background. The video signal is also supplied as a video input to a video keyer 407, whereupon the output from the image synthesize process 405 and the output from the video camera on video output 402 are combined or keyed in response to the keying signal generated by the chroma keying system 406.

The composite output is viewable on a monitor 408, similar to monitor 107 and, in addition, this output is also supplied to a studio mixer 409. The studio mixer 409 receives other video outputs on lines 410 and a selection from these video inputs is made to supply an output signal to air on line 411. This output signal is also viewable on a further video monitor 412.

Figure 5:
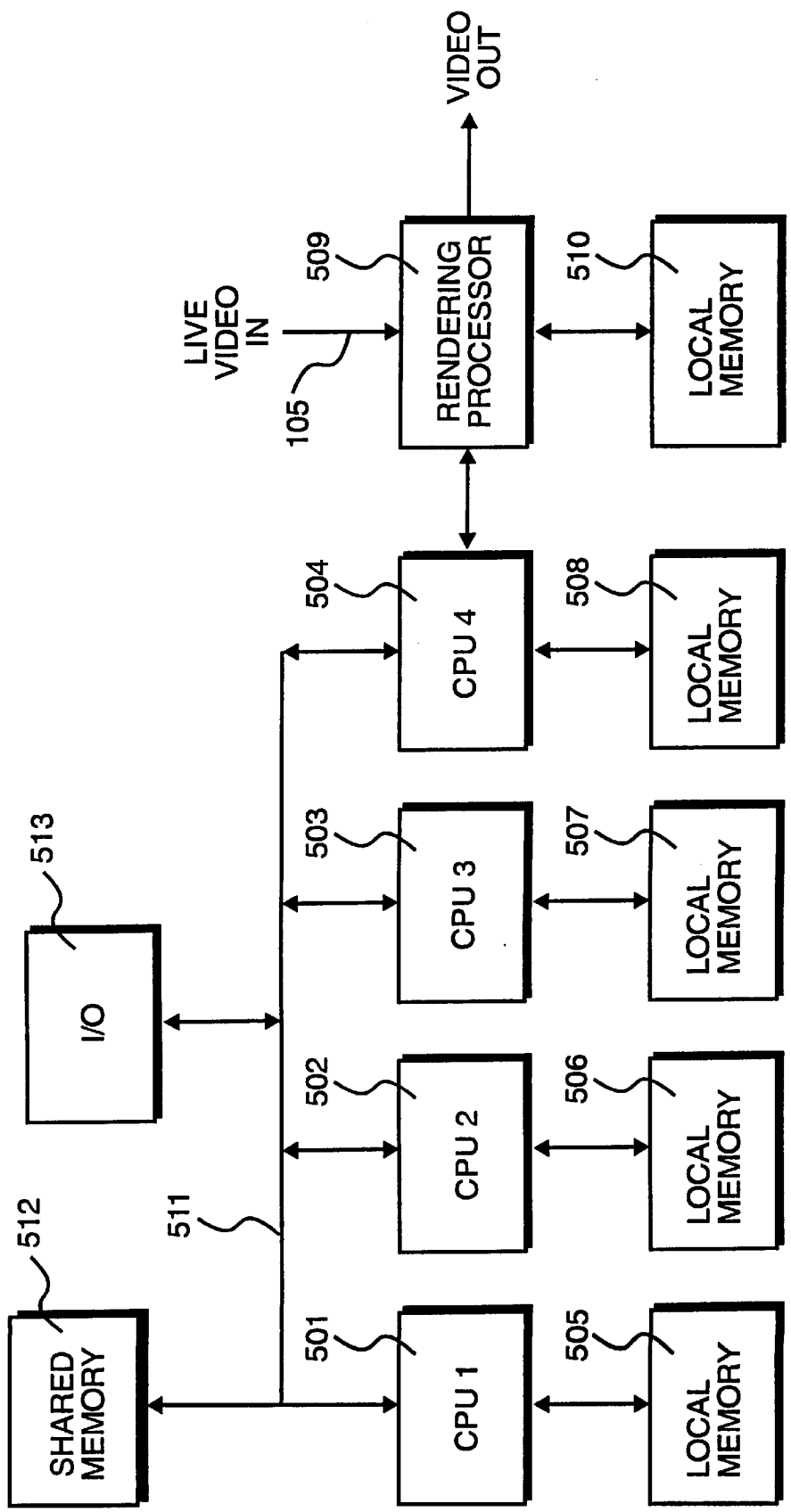
FIG. 5 details the graphics processor shown in FIG. 3 and FIG. 4, including a rendering processor and shared memory.

The graphics processor 302 shown in FIG. 4 is detailed in FIG. 5. Four main processors, CPU1 501, CPU2, 502, CPU3 503 and CPU4 504 perform the various calculations and data manipulation procedures necessary to create and mix the virtual set with images from the real camera. Each processor has high speed local memory 505, 506, 507 and 508. CPU4 504 is connected directly to a rendering processor 509, which is specifically designed to perform pixel rendering at high speed.

All four main processors 501, 502, 503 and 504 are connected via a common parallel interface. The image synthesizing application is split into logical processing tasks, with initial conditions and end conditions for each task may be made available to all processors, but with computations performed within each task done independently. This makes it possible for each task to be performed at high speed, as there is no need to communicate with other tasks on other processors until an allocated task is complete. Furthermore, local high speed memory 505, 506, 507 or 508 may be used to store data and instructions for each task, reducing the need to communicate over a global communications bus 511.

When communicating over bus 511, it is necessary to ensure that only one processor attempts to control the bus 511 at any one time, requiring time bus arbitration protocols. Furthermore, if there are four processors, the maximum data bandwidth of the bus is theoretically divided by four. In practice the reduction in bandwidth is greater than this, due to the arbitration protocols.

A further speed restriction is inherent in bus designs which connect several processors. The speed at which signals may be communicated over a electrical connections is to some extent dictated by the distance over which the signals must travel. If processors are distributed over several circuit boards, the speed of the bus 511 is restricted, especially compared with the speed of data transfers between digital components communicating on a single or closely adjacent circuit board. Thus, wherever possible, processes are split into specific tasks, which may take advantage of the particular processor architecture which is in use. For certain types of task, data may be shared between processors. Shared memory 512 is provided for this. Communications with external devices over ethernet, RS432, and high resolution monitors, computer keyboards and so on, is provided by input output interface 513.

Figure 6:
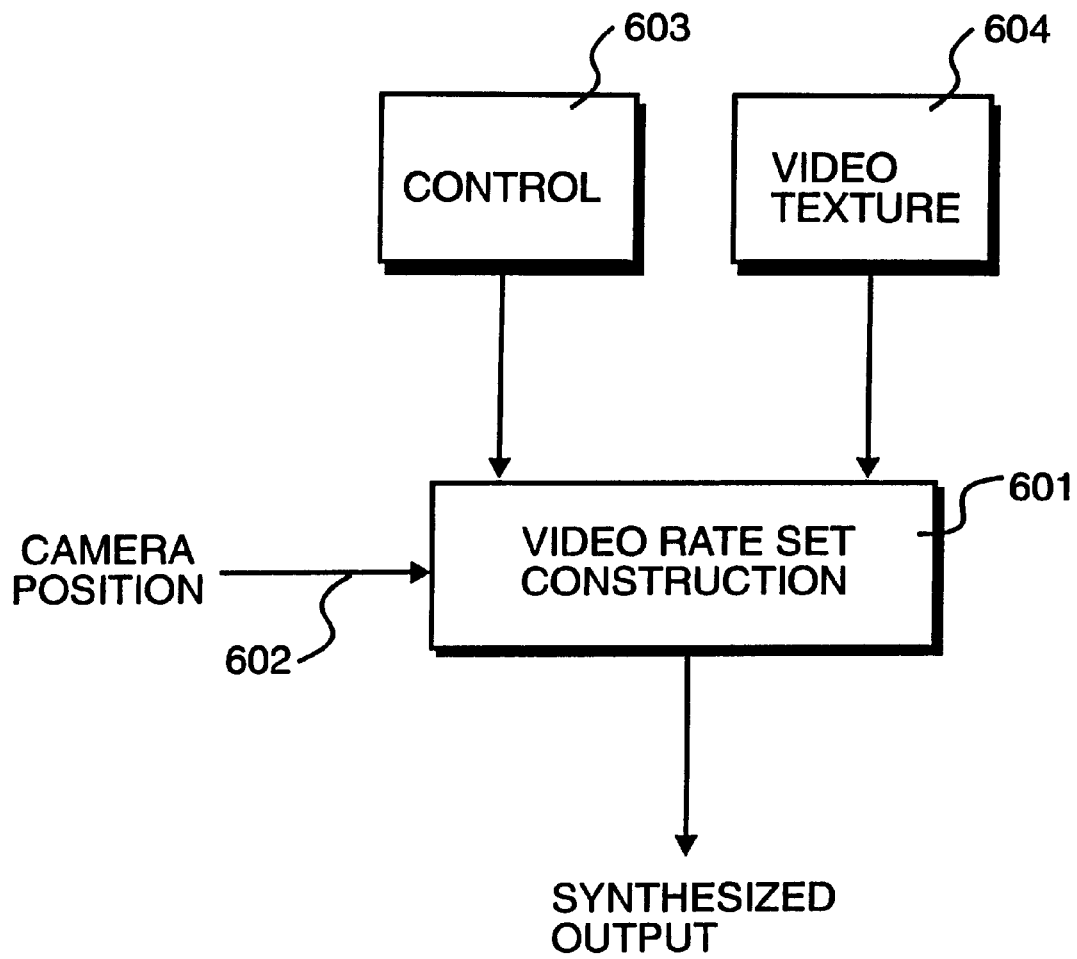
FIG. 6 details processes for combining live camera signals with virtual set images which are performed by the rendering processor shown in FIG. 5.

The image synthesis process 405 identified in FIG. 4 is detailed in FIG. 6. The camera positional data is supplied to a set construction process 601, arranged to produce image frames at video rate. Thus, it should be appreciated that the generation of image frames is performed in real time such that each frame of a video sequence is individually generated, so as to ensure that movements and transitions occur smoothly and are perceived as being as real as real objects added to the virtual scene.

Camera positional data is supplied over a line 602 and external control is received via a control process 603.

The set construction process 601 is capable of rendering surfaces and objects from polygernal primitives. In addition, image planes of full-motion video may be included within the set in response to receiving one or more video textures from a video texturing process 604.

Figure 7:
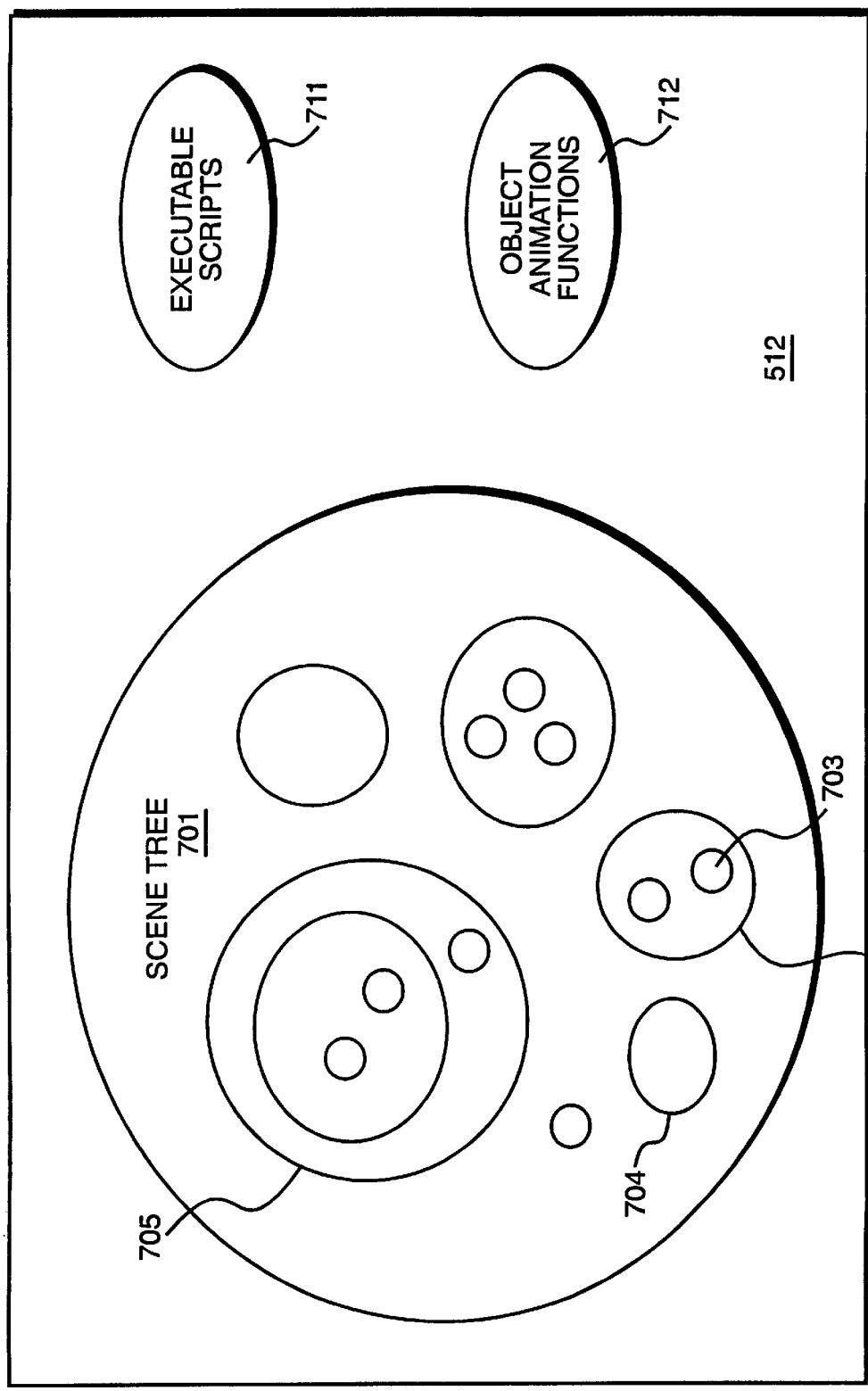
FIG. 7 details data structures stored in the shared memory shown in FIG. 5, including a scene tree, executable scripts and object animation functions.

Procedures for set construction, shown in FIG. 6, defined by data stored in the shared memory 512 shown, in FIG. 5. The virtual set is defined by a data structure known as a scene tree. A representation of the scene tree and other key data structures stored in shared memory is shown in FIG. 7. The scene tree 701 comprises a number of objects, which are defined recursively. Thus object 702 represents the stage backdrop 204 shown in FIG. 2, and an object defined within the backdrop is a link object 703 to a film clip which is supplied from some external real time video source.

Other simple objects are defined non-recursively, such as the pedestal 202, shown in FIG. 2, represented by the non-recursive object 704. Complex objects, such as the statue 203 which is also shown in FIG. 2, are defined by many layers of recursive objects within an overall object 705 defining the statue. As the scene tree is analyzed, the further down the level of recursion one goes, the simpler the object. Thus, at the lowest level of recursion, objects are defined as primitives, in other words a shape, such as a polygon, whose basic structure is understood by the rendering processor 509, and need not be further defined.

Repeated references to a single instance of a primitive object such as a polygon enable complex three-dimensional structures to be constructed from simpler ones, t whatever level of detail is required. Also included in the shared memory are executable scripts 711, which are executed at the beginning of each frame and perform manipulations on data structures defined within the scene tree 701. Object animation functions 712 enable objects within the scene tree to be manipulated in the form of an animation, for example the rotation of a propeller on a virtual aeroplane object as it flies across a virtual set.

Figure 8:
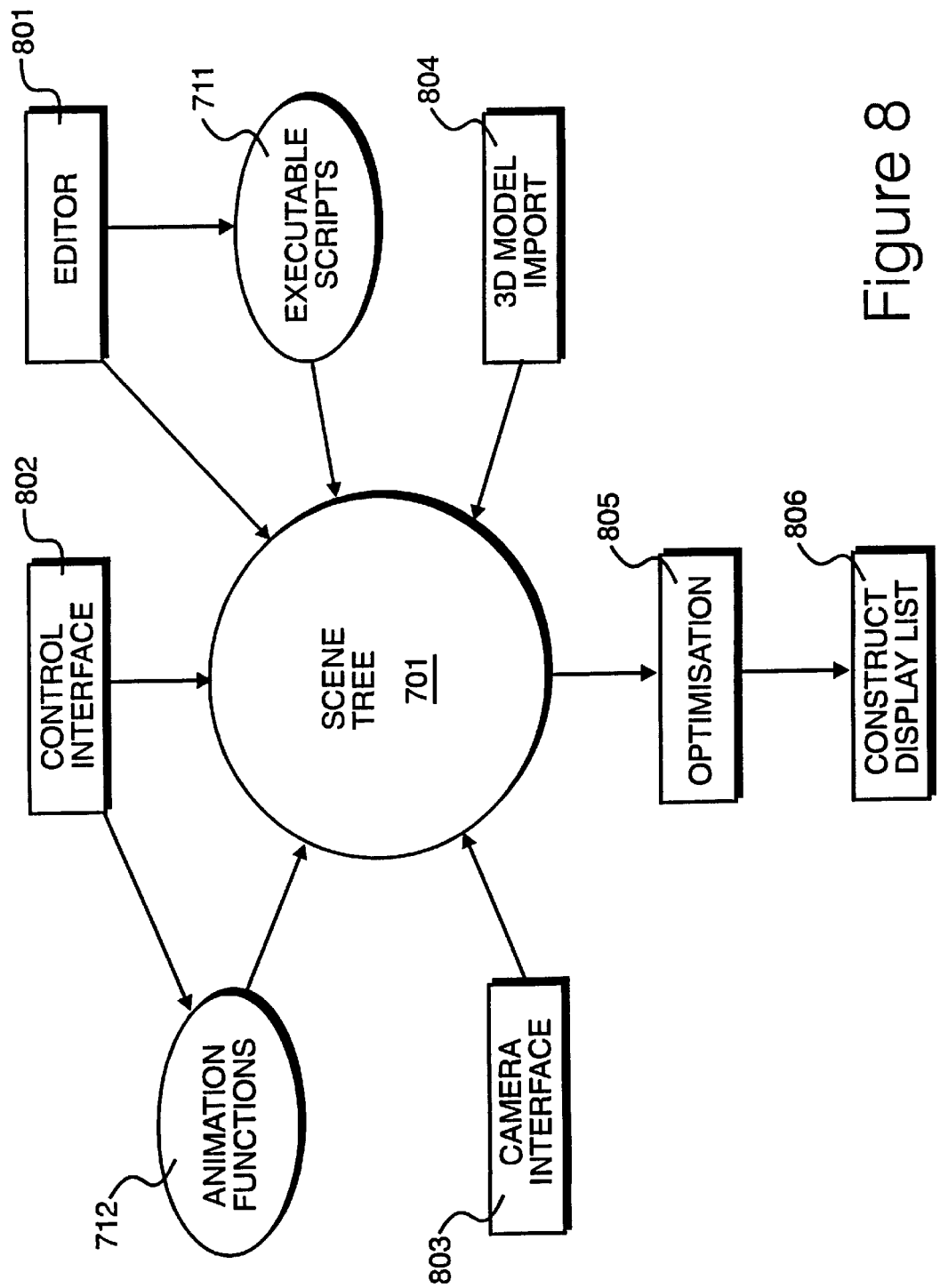
FIG. 8 details processes and relationships for modifying the scene tree shown in FIG. 7, including a process of constructing a display list.

Manipulation of the scene tree 701 is summarised in FIG. 8. The scene tree is a file which may be viewed and manipulated, though not in real time, by a text editor 801. The text editor 801 is also able to perform manipulations of the executable scripts 711. These are written in the C programming language, and are compiled so that they may be automatically executed at the beginning of each virtual set frame construction process.

A control interface supplies control data to the scene tree 701 and to the animation functions 712. The purpose of this is to enable real time control, or possibly synchronization over various aspects of the virtual set. For example, it may be desired that a virtual aeroplane should fly through the virtual set, not at a predetermined time, but rather in response to a cue from the program producer. The camera interface 803 controls the way in which the scene tree 701 is manipulated, in that data from the calibrated real camera is used to define the perspective projection of the real world onto a two dimensional plane.

Three-dimensional modelling is a time consuming task. For example, the statue 203 shown in FIG. 2 is a highly complex shape, and may even have been determined by three dimensional white laser scanning of a real object. Thus three dimensional models may be incorporated into the scene tree, via a three dimensional model import process 804. This provides access to a rich library of three dimensional shapes from a wide variety of sources. Thus, before the scene tree 701 is interpreted as a description of a particular instance in time of the virtual set, various data and or electrical signals may be used to determine conditional aspects of its structure. Once these external influences have been taken into account, the scene tree is optimised in an optimisation process 805. The optimisation process 805 attempts to ensure that the structure of the scene tree that is supplied to the rendering process is as efficient as possible. After optimisation, the scene tree is converted into a display list in process 806.

The display list generating process 806 breaks down the scene tree into vertices of object primitives which may then be supplied to the rendering processor 509. The rendering processor can then connect vertices with lines, fill polygons or other primitives with surfaces and textures, and perform other tasks related to three-dimensional graphics rendering of object primitives.

Figure 9:
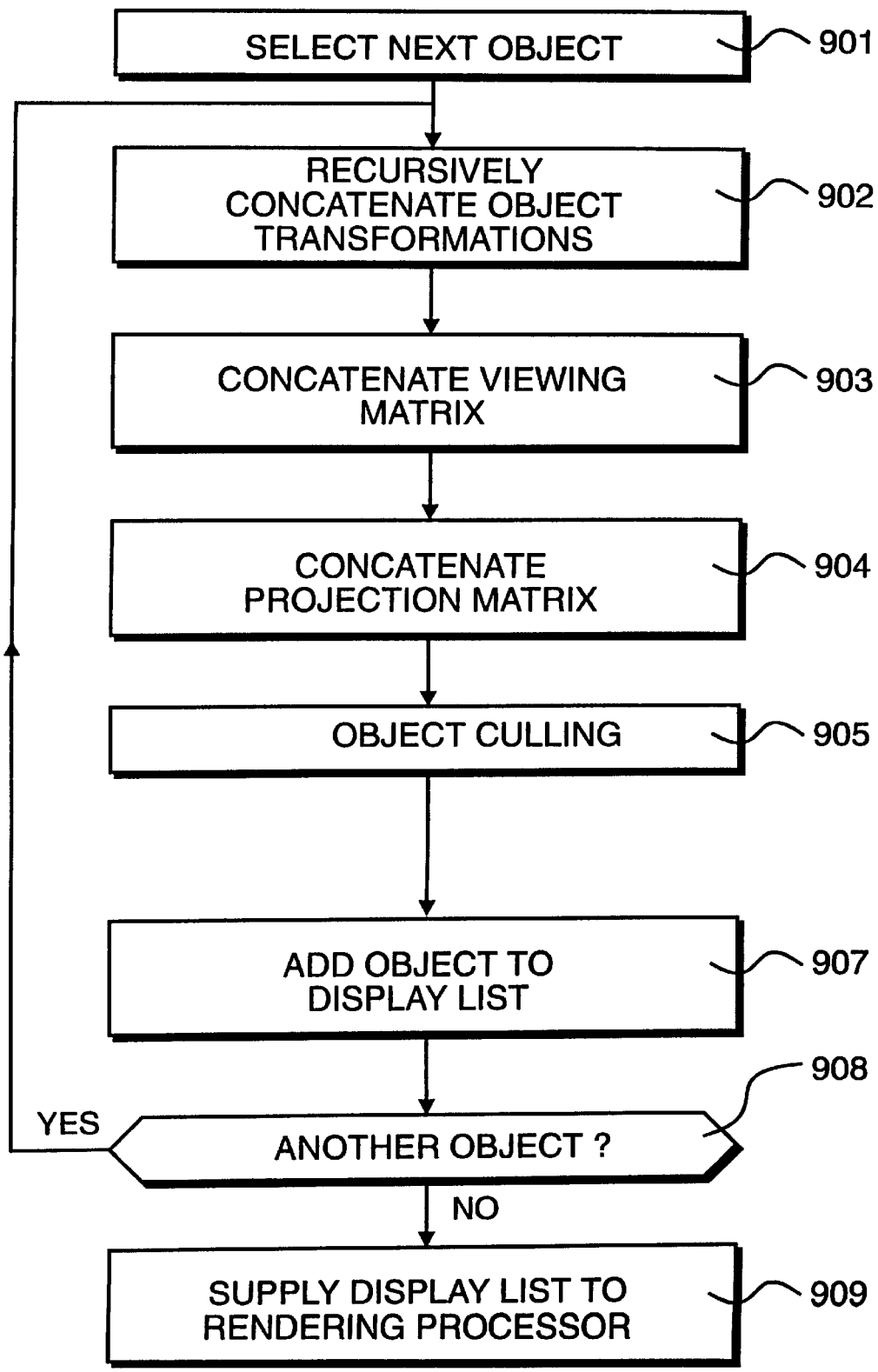
FIG. 9 details the process of constructing a display list shown in FIG. 8.

The process 806 of generating a display list is detailed in FIG. 9. In process 901, the next object is selected. In process 902, object transformations are concatenated. Each object, whether it is a primitive or not, may be manipulated in a number of ways in order to perform animation or related function. These manipulations are combinations of movement or translation, stretching or rotation. These basic transformations are known as affine transformations. Each such manipulation is performed arithmetically by evaluating a transformation matrix multiplied by the points which define the vertices of an object. Given a set of points in three-dimensional virtual space, generally referred to as vertices in world space, each vertex may be multiplied sequentially by any number of transformation matrices, thus enabling complex manipulations to be performed, without having to calculate a unique equation for any one of an infinite variety of possible geometric transformations.

Furthermore, by sequentially multiplying by several transformation matrices, in the form of a list of transformations, it becomes possible to remove transformation matrices from the list, and so undo effects which turn out to be undesirable. This is the general approach adopted in most two dimensional and three dimensional graphics systems. The process of multiplying by a list of matrices is known as matrix concatenation. Matrices may be used for special operations, other than modifying position or shape in world space, including projecting a view of a three dimensional model into a two dimensional plane, such as that of a video frame.

A non-intuitive aspect of transformation matrices is that matrices for use in two-dimensions are defined as three-by-three matrices, and three dimensional transformations are accomplished using four-by-four transformation matrices. The co-ordinate system used in a four-by-four matrix system is not x,y,z, but x/w, y/w, z/w and w. The variable w is not a physically measurable quantity, but provides a mathematical representation that makes the general technique of matrix concatenation possible.

As objects may be defined recursively, in process 902, the object is analyzed into its lowest constituent objects. Then, working back up the recursive data structure, transformations at each level are concatenated onto the list of vertices which are defined as making up the object at the current level of recursion. In this way, for example, the propeller of a virtual model aeroplane may rotate. This propeller is itself part of a larger object, the aeroplane, which flies from one side of the studio to the other. Thus a transformation of rotation are concatenated for the propeller object, and then transformations defining the path of flight are concatenated for the plane object. Considering a single vertex on the propeller, this will have rotation and the various path of flight transformations concatenated to it, while other parts of the aeroplane will have only the path of flight transformations. This, therefore, is the highly structured approach to three-dimensional modelling which is adopted when defining objects for use in a virtual studio.

In process 903, a viewing matrix is concatenated, in addition to whatever other transformations have already been concatenated. The viewing matrix is a special matrix, defined by the location of the real camera, and is required in order to simplify projection of the three-dimensional world space into a two dimensional plane which will be performed in process 904.

The world space in which objects are defined by the scene tree may be considered as a fixed volume, with any point in it defined by an x,y,z co-ordinate; but with the four co-ordinate system (x/w, y/w z/w and w) being preferred. The initial non-transformed state of any vertex has the value w equal to unity, so x/w, y/w and z/w are in fact equal to x,y and z before transformations have been applied. At some stage in the rendering process, it will be necessary to project an image onto a two-dimensional plane, which may be considered as the plane of the image focused in the virtual camera, and the image of the virtual world which would be displayed on a monitor.

This two-dimensional projection has a variable angle with respect to the x, y and z axes of the virtual world space. An equation may be used to define this plane, in terms of the x,y,z co-ordinates of world space. Then it might be possible to project the three dimensional model onto this space using basic geometrical equations. In three dimensions, this approach requires considerable calculation, and a simpler solution is to rotate and move all objects in world space so that the projection plane is defined by the xy axes, and is perpendicular to the z axis. Thus, concatenation of the viewing matrix, performed in process 903, rotates and moves any object in world space so that the system of co-ordinates is normalized to the location of the projection plane. Another way of viewing this is that the virtual camera remains still while the virtual world moves around it; corresponding to a fixed real world that is viewed by a moving real camera. The relative movements are identical.

In process 904, perspective projection of the currently selected object onto the projection plane is performed by concatenating a projection matrix. Note however, that the z co-ordinate is not discarded or set to zero, as this is required in order to perform hidden surface removal.

In process 905 object culling is performed. Objects which lie outside the xy coordinate range of the projection plane are discarded, as are objects which are too close or too far from the virtual camera, for example, objects which are behind the virtual camera might otherwise be displayed as being inverted, when they should not be displayed at all.

In process 907 the resulting vertices are added to the display list, along with a reference to the object primitives which they define, and other details, such as the type of surface, texture, specular reflectivity and so on. This information will later be used by the graphics rendering processor 509 which has highly optimised circuits for translating this information into frame pixel data in real time.

In process 908, a question is asked as to whether any other objects remain to be added to the display list. If no other objects remain, the display list is supplied to the graphics pipeline of the rendering processor 509. Construction of the display list takes a variable amount of time, depending on the number and complexity of the objects and transformations which it defines. Thus the display list may be produced well in advance of the next frame, or possibly take longer than one frame to calculate. The graphics pipeline is a concept which synchronizes display lists with video frame outputs. Thus, when a display list is early, it is stored in the pipeline until it is needed. If the display list cannot be generated in time for the next frame, the previous display list is used, thereby minimising the visible effects. Clearly, though, this is a situation which is avoided if at all possible, as it reduces the realism of the resulting image.

Due to the amount of parallel processing which occurs in the system, a delay of a few frames is incurred. Thus the image of the combined virtual world and the real world is noticeably delayed in time by a fraction of a second with respect to the real time. This delay is related to the processing capacity of the computer hardware used to render the virtual images, and may be expected to decrease as more processing power becomes available.

The sequence of steps shown in FIG. 9 results in an image being drawn by the rendering processor 509. All objects seen by the virtual camera have sharp focus, whereas only those objects which are in the plane of focus in the real studio will have such a sharp focus. Thus, if the real camera 103 zooms in on the statue 203 shown in FIG. 2, the virtual backdrop 204 remains perfectly in focus. This results in a departure from the ideal of the virtual studio, where all objects (real or virtual) appear to exist within a single coherent studio, passing through a camera optics which do not differ for real or virtual images.

Figure 10:
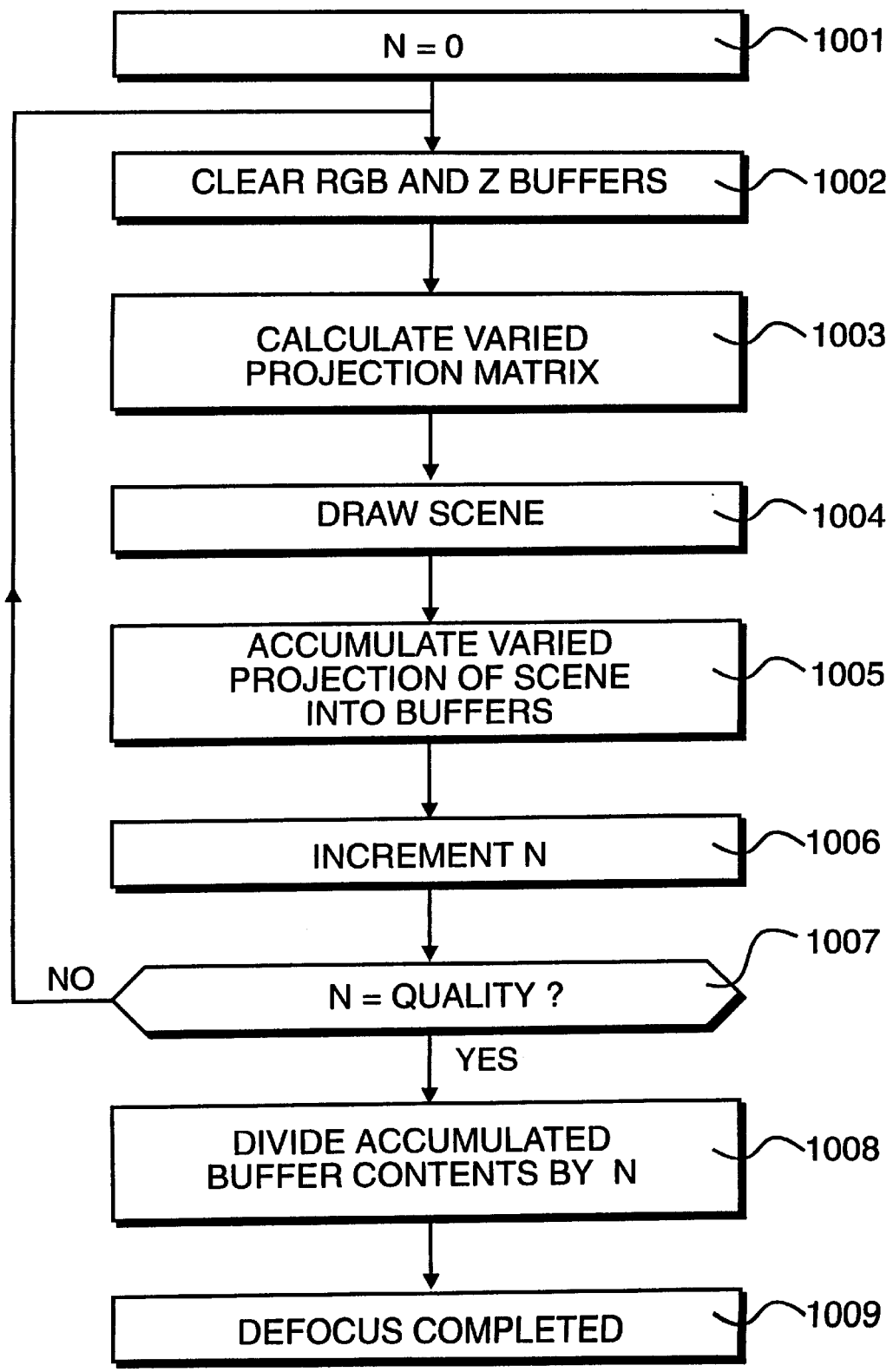
FIG. 10 details an arrangement for de-focusing images generated substantially in accordance with the operations shown in FIG. 8, including calculating a varied projection matrix.

An improved procedure is shown in FIG. 10. In process 1001, a counter N is reset to the value zero. In process 1002, four pixel plane buffers are reset to zero. Each buffer contains a single memory location for each pixel, each memory location being defined by a certain number of bits, depending on the accuracy required. Thus there are pixel plane buffers for red, green and blue colour pixels. In addition, a z buffer is used to facilitate hidden surface removal, by storing a z value for each pixel. As each object is rendered, red, green and blue pixels may only be written to if the z value for the new object is greater than the z value presently held for that pixel in the z buffer.

In process 1003 a projection matrix is calculated, in which the position of the virtual camera is shifted slightly in the x and y planes. The matrix is calculated such that the degree of shift is proportional to the z value of the vertex which is being projected. The plane in focus is considered to have a z value of zero. Objects in front of or behind the plane in focus have increasingly larger, in negative or positive domains, z values, resulting in increasingly larger degrees of shift. The plane in focus is known from the measurement of the displacement of the focus ring on the lens 104 of the real camera 103, which is used in conjunction with calibration data for that particular lens to give a particular z value for the plane in focus, for each frame of video which is generated by the camera.

Thus, as the camera operator manually adjusts the focus ring on the lens, this information is supplied to the graphics processor, and used to calculate a viewing matrix, which is concatenated onto vertices of objects in step 903 in FIG. 9, such that the position of the plane in focus is always normalized to a z value of zero before projection occurs in step 904.

In step 1004, the scene is drawn in accordance with the processes shown in FIG. 9. This results in a particular image being stored in memory, which represents the view generated by the varied projection matrix calculated in process 1003. In process 1005, this image is accumulated with previously generated images resulting from the varied projection matrix. Thus, each red pixel generated for the current iteration of the scene is accumulated with previous iterations of the scene. In a large solid object, located outside the plane in focus, most of the area of the object which is rendered will be the result of several accumulated scene drawing iterations. However, at the edges of the object, due to the slight offset of each drawn scene in the x and y dimensions, there will be a number of less intense renderings of the object, which provide the illusion of defocus.

In process 1006 the counter, N, is incremented. In process 1007 a question is asked as to whether the value of N is now equal to a predefined quality value. If N is less than this amount, control is directed to process 1002, and another version of the scene is drawn; this time from a slightly different viewpoint. Thus, the number of times this loop is performed depends on the quality of de-focus which is required. Clearly it takes time to draw a scene several times, and different values of quality may be selected accordingly.

In process 1008, the accumulated buffer contents are divided by N, the number of times the loop has been executed. Thus, if a red pixel having the true colour value 15 is written to the accumulated pixel plane eight times, the resulting accumulated red pixel value will be 120. By dividing this amount by N, the true colour value returns to 15. If the red pixel was at the edge of a de-focused object, it is possible that several different values of red will be accumulated. Dividing by N results in the average of these being used in the final image, thus achieving the change in colour intensity required for the defocus effect. Once the buffer contents have been divided by N in process 1008, control is directed to process 1009, where it is known that the defocus for the current frame has been completed.

The varied projection matrix used in process 1003 in FIG. 10 is detailed in FIG. 11. Also shown in this Figure are equations for calculating dx and dy, which are the small increments in x and y used to generate the defocus effect. dx and dy are respectively dependent on several other variables, defined elsewhere in the graphics system, including kx and ky. kx and ky are constants, determined experimentally, which define the degree of shift produced at each iteration of the defocus loop. Other values are right, left, top and bottom, which are the minimum and maximum x and y values for the projection plane. The window resolutions in x and y are used, so that kx and ky may be defined in terms of pixel units.

The operation of a four by four matrix is shown in FIGS. 12A, 12B and 12C. In FIG. 12A a four by four transformations matrix is shown. As stated earlier, four dimensions are used for reasons of mathematical expediency. The fourth dimension is 2, and the x,y,z physical dimensions are replaced by x/w, y/w and z/w. Typically, vertices start of with a w value of one. It is only during perspective viewing, or certain other unusual transformations, that a vertex includes a non-unity value of w.

In FIG. 12A, the vertical columns represents x'/w', y'/w', z'/w' and w' outputs, while the horizontal rows represent the x/w, y/w, z/w and w inputs. At each intersection of a row and a column is a value or a function which may be evaluated. The combinations of these functions define how an input x/w, y/w, z/w, w vertex co-ordinates are translated into their respective x'/w', y'/w', z'/w' and w' co-ordinates. The relationships between input co-ordinates and output co-ordinates are defined according tot he equations shown in FIG. 12B. It may be seen that each output co-ordinate may be defined by any mathematical relationship of the four input co-ordinates.

Typically, in most matrixes, many of the matrix intersections will be set to zero, so that, for example x'/w' does not depend on y/w if b is set to zero. The power of the additional w co-ordinate may be appreciated when FIG. 12C is considered. Here, the x', y' and z' co-ordinates are recovered from x'/w', y'/w', z'/w', w'. The values x', y' and z' may all be modified if the value of w' has changed at some point in the matrix calculations. This fact enables far more complex equations to be represented in matrix form than if only the three physical dimensions are used. This type of co-ordinates are known as homogeneous co-ordinates.

It is therefore possible to write out the operations represented by the matrix shown in FIG. 11 in a direct algebraic form. Here it may be seen that the deviation in x and y is made proportional to z, so that no deviation occurs for objects in the plane in focus, for which z is zero. The other aspects of these equations relate to projection of a line from a vertex through a vertical two dimensional plane at the plane in focus, through to the front nodal point of camera lens. The front nodal point of the lens is the point through which rays theoretically converge. This point changes depending on the zoom position. Thus the front nodal point is calculated from the current position of the zoom lens in conjunction with calibration data for the lens from which the front nodal point may be derived.

Figures 13, 14:
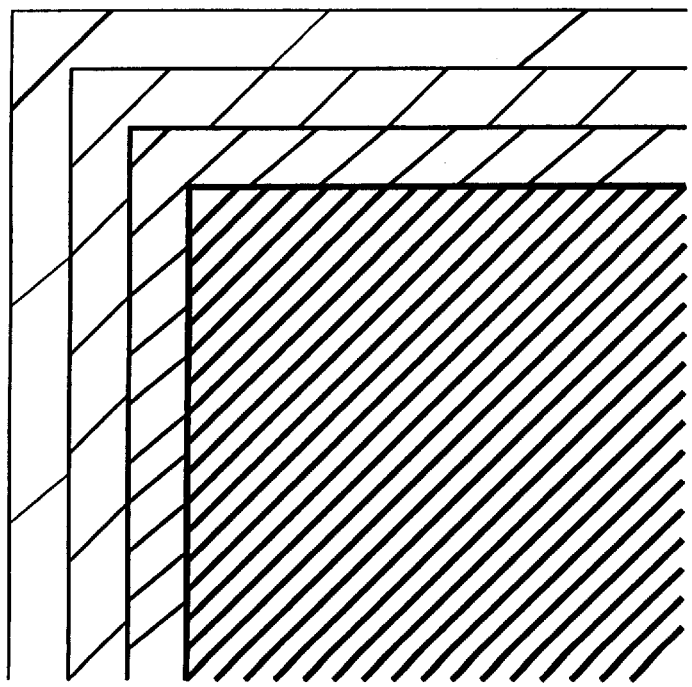
FIG. 13 details an algebraic expansion of the projection matrix shown in FIG. 11.
FIG. 14 details the edge of a virtual object which has been defocused in accordance with the processes shown in FIG. 10.

FIG. 14 shows the effect of repeated shifting of the viewpoint on an object which is outside the plane in focus. The main part of the object has its true colour, while the edges differ in intensity according to the number of times the red, green and blue values for the object were accumulated into the respective pixel buffers.

Figure 15:
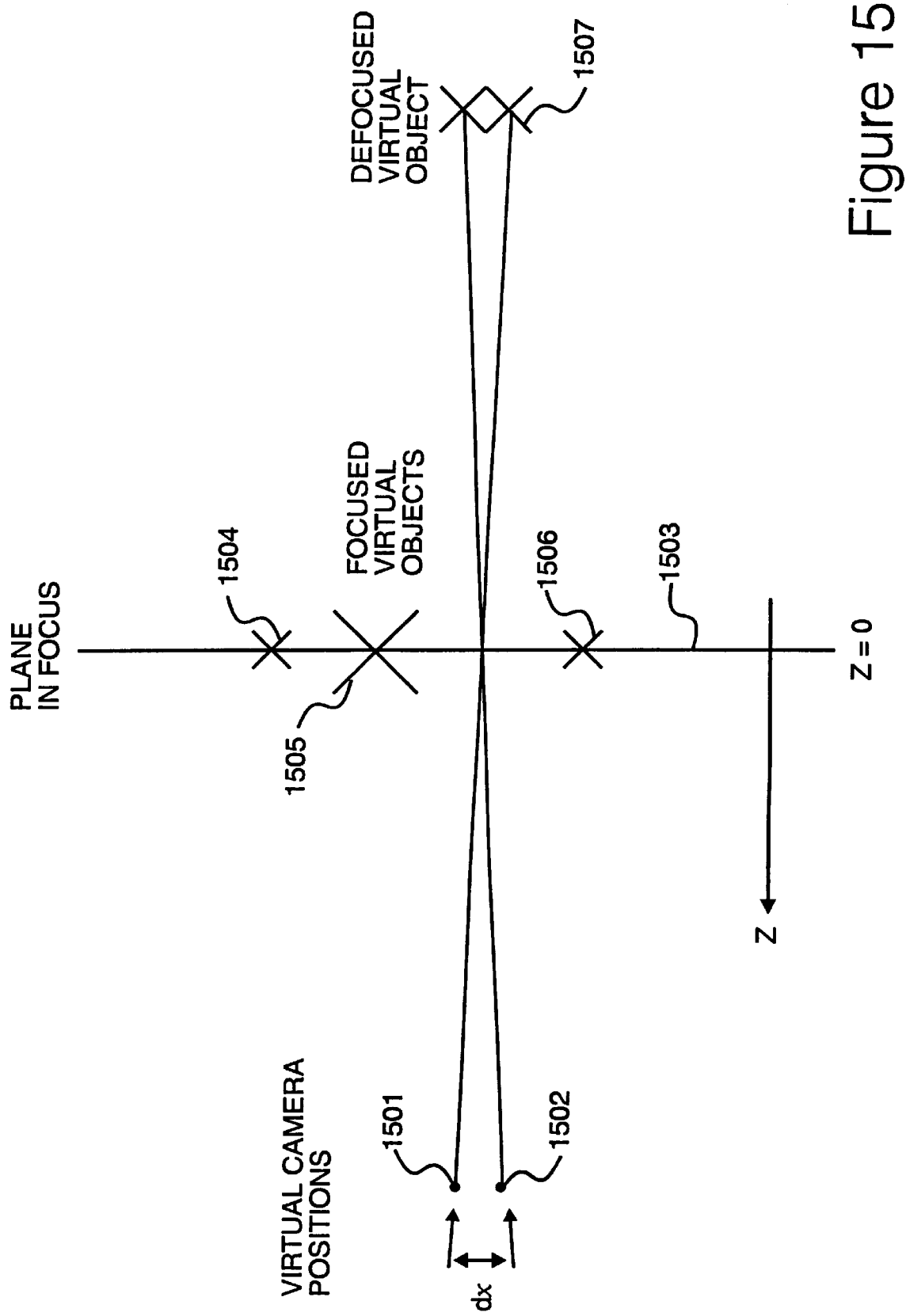
FIG. 15 shows a plan view of the object de-focusing process.

FIG. 15 shows a top down plane of a virtual set. Two camera position, 1501 and 1502 are separated by a distance dx calculated according to the equation shown in FIG. 11. Objects 1504, 1505 and 1506 in the plane in focus 1503 do not shift, as their z co-ordinates are zero. A virtual object 1507 far from the plane in focus 1503 is shifted considerably. FIG. 15 represents the situation after two iterations of the defocus loop shown in FIG. 10. In practice a larger number of iterations will usually be considered necessary to achieve a suitable level of quality, a typical number being in the region of four to eight.

What is claim is:

1. A method of processing image data, wherein real image data generated by a camera is combined with synthesized image data, comprising steps of generating camera positional data representing characteristics of said camera, including an indication of zoom control;

generating a synthesized image in response to said position data; and adjusting the perceived focus of said synthesized image in response to zoom control adjustments, so as to effect a focusing difference between a portion of said real image and a portion of said synthesized image.

2. A method according to claim 1, wherein a portion of said synthesized image is de-focused to emphasise its location behind said portion of the real image.

3. A method according to claim 1, wherein a portion of the synthesized image is de-focused to emphasise its location in front of said portion of the real image.

4. A method according to claim 2, wherein de-focusing of a synthesized image includes de-focusing portions both behind and in front of said real image.

5. A method according to claim 1, wherein de-focusing is effected by varying projecting matrixes.

6. A method according to claim 1, wherein de-focusing is performed a plurality of times where the value of said plurality is adjustable.

7. A method according to claim 1, wherein calculated pixel values are accumulated on each iteration and said accumulated values are divided by the number of iterations made.

8. Apparatus for processing image data, comprising a camera arranged to generate real image data;

synthesizing means arranged to synthesize image data;

positional data generating means arranged to generate camera positional data representing characteristics of said camera, including an indication of zoom control, wherein said synthesising means is arranged to generate a synthesized image in response of said positional data, and said synthesizing means as arranged to adjust the perceived focus of said synthesized image in response to zoom control adjustments, so as to effect a focusing difference between a portion of said real image and a portion of said synthesized image.

9. Apparatus according to claim 8, wherein said synthesizing means is arranged to defocus a portion of said synthesized image to emphasise its location behind said portion of the real image.

10. Apparatus according to claim 8, wherein said synthesizing means is arranged to defocus a portion of said synthesize image to emphasize its location in front of said real image.

11. Apparatus according to claim 8, including accumulating means for accumulating pixel values generated by a plurality of defocusing operations.

\* \* \* \* \*

UNITED STATES PATENT AND TRADEMARK OFFICE
CERTIFICATE OF CORRECTION

PATENT NO. : 5,949,433
DATED : September 7, 1999
INVENTOR(S) : Karl-Heinz Klotz It is certified that error appears in the above-identified patent and that said Letters Patent is hereby corrected as shown below:

Column 1, line 32, change "or Armand Fellows" to --of Armand Fellous--;
         lines 37 and 38, change "programme" to --program--.

Column 6, line 10, delete "a";
         line 36, change "polygernal" to --polygonal--.

Column 7, line 56, change "function" to --functions--.

Column 11, line 53, after "point of" insert --the--.

Column 12, line 61, change "synthesize" to --synthesized--.

Signed and Sealed this

Twenty-fifth Day of July, 2000

Attest:

Q. TODD DICKINSON

*Attesting Officer*  *Director of Patents and Trademarks*

UNITED STATES PATENT AND TRADEMARK OFFICE
CERTIFICATE OF CORRECTION

PATENT NO. : 5,949,433
DATED : September 7, 1999
INVENTOR(S) : Karl-Heinz, Klotz It is certified that error appears in the above-identified patent and that said Letters Patent is hereby corrected as shown below:

On the title page, under item [73], "Montrial" should be -- Montreal --.

Signed and Sealed this

Twenty-ninth Day of August, 2000

Attest:

Q. TODD DICKINSON

*Attesting Officer*  *Director of Patents and Trademarks*